N. P. HARSHBERGER

SHINGLE

March 21, 1933.

Re. 18,772

Original Filed Oct. 20, 1925

2 Sheets-Sheet 1

INVENTOR:
Norman P. Harshberger
BY E. J. Andrews
ATTORNEY.

N. P. HARSHBERGER
March 21, 1933. SHINGLE Re. 18,772
Original Filed Oct. 20, 1925 2 Sheets-Sheet 2
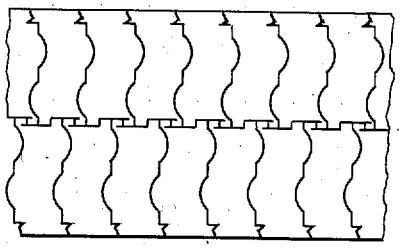
Fig. 5
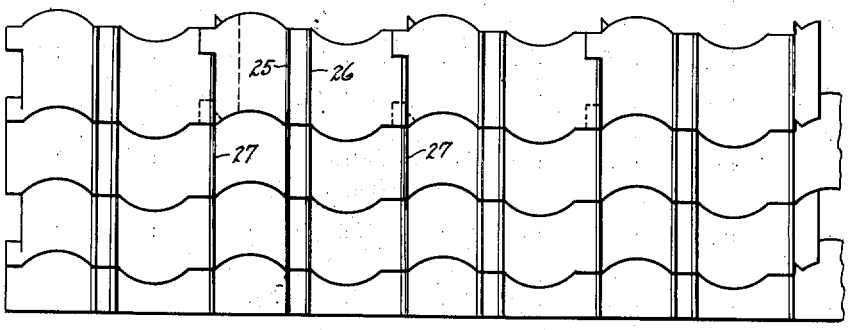
Fig. 6
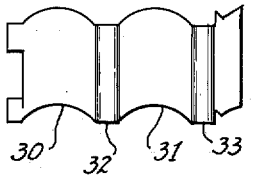
Fig. 9
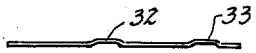
Fig. 10
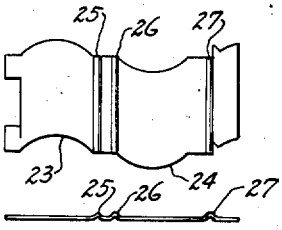
Fig. 7
Fig. 8
INVENTOR:
Norman P. Harshberger
BY E. J. Andrews
ATTORNEY.

Reissued Mar. 21, 1933 Re. 18,772

UNITED STATES PATENT OFFICE

NORMAN P. HARSHBERGER, OF SCARSDALE, NEW YORK, ASSIGNOR TO BAKELITE BUILDING PRODUCTS COMPANY, INC., OF NEW YORK, N. Y., A CORPORATION OF DELAWARE

SHINGLE

Original No. 1,718,933, dated June 25, 1929, Serial No. 63,603, filed October 20, 1925. Application for reissue filed June 25, 1931. Serial No. 546,877.

This invention relates to shingles and has for its object the production of a shingle which will produce a very pleasing appearance on the roof and will very effectively cover and protect the roof.

Among the detailed objects of this invention is the provision of composition shingles which when applied to a roof will produce a close simulation of a thatched roof, the outstanding characteristic of which is that although all of the edges are firmly held in place no interlocking means are visible when the roof is completed. As will be readily appreciated the most undesirable feature of imitation roofs is the unsightly appearance of notches, slits, tabs, etc., which immediately detract from the appearance because of the fact that no such features were ever present in antique thatched roofs.

Another detailed object of the invention is the provision of an interlock between shingles in which a slit coacts with a notch or another slit, which has been found to be far more efficient than interlocks produced by pairs of notches.

A still further object of the invention is to interlock the lower exposed edges of my improved shingles in such a manner that they are prevented from blowing up, regardless of wind or rain to which they may be subjected.

Figure 1:
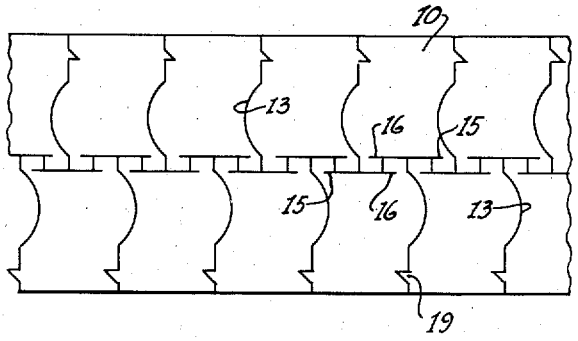
Figure 2:
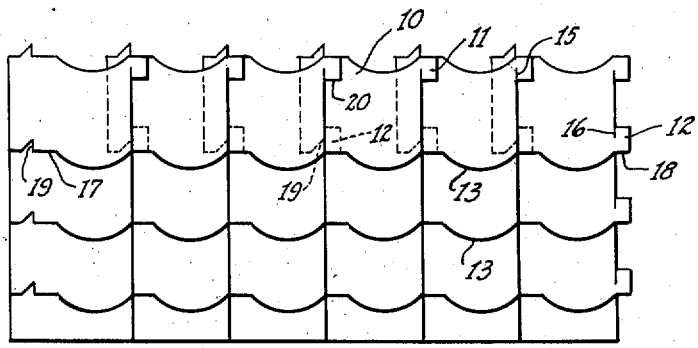
Figure 3:
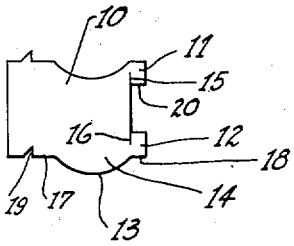
Figure 4:
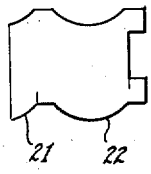

A still further object of the invention is to shape the shingle so that the above mentioned objects will be obtained and the shingles may be cut from strips without any waste. Other objects of the invention will be apparent from a consideration of the accompanying drawings and the following description thereof:

Of the drawings, Fig. 1 is a plan view of a strip of shingle material showing how the shingles are cut from a strip; Fig. 2 is a plan view of a portion of a roof with the shingles assembled thereon; Fig. 3 is a plan view of the individual shingles shown in Figs. 1 and 2; Fig. 4 is a plan view of a slightly modified shingle; Fig. 5 is a plan view of a strip showing the manner in which another modified form of shingle is cut therefrom; Fig. 6 is a plan view of the shingles of Fig. 5 when assembled; Fig. 7 is a plan view of an individual shingle of Fig. 5; Fig. 8 is an edge view of the same; Fig. 9 is a plan view of another form of shingle; and Fig. 10 is an edge view of the same.

The shingles illustrated in Figs. 1 and 3 comprise the body portions 10 having lugs 11 and 12 and edges 13. These edges may be shaped as shown or otherwise shaped so as to affect the appearance of the roof, as they are the lower edges of the lap portion 14 which is exposed below the upper layer of shingles. The shingles also have slits 15 and 16 when desired, and notches 19. The edge 13 as shown is of curved formation to imitate a thatched roof and this edge lies between two other edges 17 and 18, said last named edges being substantially in the same plane. The edges 17 and 18 extend at approximately right angles to the transverse edges of the shingle proper, and in addition to imparting a pleasing appearance also serve as registering means to guide the roofer when applying the shingles. It will further be seen that the slits 15 and 16 are a continuation of one side edge of the shingle proper and result in one of the exposed joining edges of the shingle when applied to a surface to be covered. The provision of the interlock so that this right hand edge is exposed not only results in a thorough manner of locking the shingles together and holding them down but additionally produces a pleasant appearance in that the said right hand edge lying on top of the adjacent shingle accentuates this edge and gives the appearance of thickness to the shingle.

As will be seen by an inspection of Fig. 2, the shingles are laid in strips, running longitudinally on the roof, and the individual shingles in the strips form rows running up and down the roof, but the shingles of one may be staggered with reference to those of an adjacent strip if desired.

The strips are formed by connecting individual shingles, the lug 12 of a left hand shingle passing under the lower edge of the adjacent shingle and the slit 16 co-acting with the notch 19 so that the edge 18 of the left hand shingle registers with and is immediately beneath the edge 17 of the right hand shingle. This arrangement is repeated with the edges of the other adjacent shingles in the strip, and in this way the individual shingles are formed into strips which are held together by the coaction of the slits and notches. The strips are thus independent of each other and may be laid on the roof substantially the same as ordinary strip shingles. Each strip may lap over the adjacent underlying strip so far as may be desired. In this instance, however, I prefer to have the shingles of the overlying strip lap on the underlying strip until the edges 18 of the overlying strip register with the edges 20 of the underlying strip. In this way three shingle thicknesses are provided at this point, and a more pronounced line of demarkation between the strips is provided. This improves the appearance of the roof. Also, by having an interlocking slit and notch, the interlocking can be made more quickly and is more effective. The notch allows the slit to be quickly placed, while the slit holds the two shingles firmly in their relative positions. With two notches the connection would be loose and the shingles would easily shift more or less out of their relative positions. In laying the shingles they are often locked together in rows, and the rows are then shifted into position with reference to adjoining rows, and it is important that there be no relative shifting of the individual shingles.

It will be understood that the locking together of the lower edges of the shingles as explained prevents these exposed edges or corners from warping or blowing upwardly. The edges 13 may be bowed upwardly instead of downwardly if desired, and the particular form of these edges is not a material part of the invention. When the edges are bowed upwardly the slits 15 are used and they coact with notches or slits on the same side but at other end of adjacent shingles.

Fig. 4 illustrates a slightly modified form of shingle in which the lower edge is curved to correspond to the curve of the exposed lower edge of the adjacent overlying shingle and thus registers with and is immediately beneath the portion 22 of the adjacent overlying shingle. This shingle is quite similar to that shown in Fig. 3 with the exception that only one slit in a transverse or end edge is provided and this occurs between the lower lug and the body portion, the other slit in this side being omitted. At the opposite end of the shingle a second slit is provided instead of notch 19, and the lug 21 adjacent this slit extends downwardly to produce a different form of interlock. It will be noted that this shingle is just as capable of being cut from a strip without waste as the previously described shingle of Fig. 3. By extending the portion 21 downwardly below the registering edge greater protection is afforded and water is positively prevented from reaching the supporting structure, such as the sheathing of a roof. Ordinarily the interlock provided on the shingle shown in Figs. 1, 2 and 3 is sufficient and this is especially true in a recoving job. However, in a vicinity which is subject to unusual storms the shingle of Fig. 4 is especially useful.

The type of shingle illustrated by Figs. 5 and 8 is similar in general to that of Figs. 1 to 3, but is substantially double length and has the curved edges 23 and 24 alternating up and down as indicated. The manner of cutting these double shingles from the strips is also similar as is the manner of assembling. In this instance the strips are shown assembled so that the shingles in one strip are not staggered with reference to those of the adjacent strip. It is to be understood, however that this is a mere matter of preference, as these and also the type of shingles of Figs. 1 to 3 might be staggered if desired. In case of Figs. 5 to 8 transverse ridges 25, 26 and 27 are formed in the shingles. These ridges add to the appearance of the roof, and the ridges 27 prevent rain from driving under the edges of the adjacent right hand shingles. The ridge of each shingle registers with the ridge of the adjacent underlying shingle and thus forms what appears as a continuous ridge running up and down the roof.

Figs. 8 and 9 illustrate a slightly modified form of shingle in which the edges 30 and 31 bow upwardly on the roof and the ridges 32 and 33 are wide and flat. In this case each end of these ridges registers with a ridge on the adjacent overlying or underlying shingle, and serve as an indicating spacing means.

The ridges 27 and 33 are positioned immediately at one side of the slits on the lower edges of the shingle and this provides a raised portion for the lugs to slip under when the corners are being locked together as the shingles are laid.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A shingle having a lug extending from the corner of one edge thereof, and a slit extending part way between said lug and the body of the shingle on the side of the lug most remote from the edge, and a second slit in the said edge near the opposite end of the shingle and adapted to coact with the lug on an adjacent shingle, and a raised portion on the shingle immediately at one side of said second slit.

2. A rectangularly shaped shingle having a lug extending from the corner of one edge thereof, and a slit extending part way between said lug and the body of the shingle on the side of the lug most remote from the edge, a second slit in the said edge near the opposite end of the shingle and adapted to coact with the lug on an adjacent shingle, and a second lug extending from the corner nearest to said first mentioned corner.

3. A shingle of general rectangular shape, but having a tongue projection from each corner of one end, one of the said tongues having a slit therein, said slit extending inwardly of said tongue from the side thereof most remote from the adjacent side of the shingle, and the said side of the shingle having a notch therein adjacent the other end of said side and projecting inwardly from said side edge, the said tongue of the shingle being adapted to lie under the end of another similar shingle with the slit interlocking with the notch of the other similar shingle.

4. A shingle of general rectangular shape, but having a tongue projection from each corner of one end, one of the said tongues having a slit therein, said slit extending inwardly of said tongue from the side most remote from the shingle side, and the shingle having a second notch in said side adjacent the other end of said side and projecting inwardly from said side edge, the said slitted tongue being adapted to lie under the end of another similar shingle with the slit of one shingle interlocking with the notch of the other shingle, and the inner ends of the said slit and notch substantially registering.

5. A shingle having a lug extending from the corner of one edge thereof, and a slit extending between said lug and the body of the shingle, and a notch in the adjacent edge near the remote end thereof, said notch being adapted to coact with the slit on an adjacent shingle, and a raised portion extending across said shingle immediately at one side of said notch.

6. A rectangularly shaped shingle having a lug extending from a corner of one end thereof, and a slit extending part way between said lug and the body of the shingle on the side of the lug most remote from the shingle side, said shingle having a notch in its said side near the opposite end of the shingle, said notch being adapted to coact with the slit in an adjacent shingle, and a second lug extending from the other corner of said first mentioned end and adapted to lie under the slitted lug of another similar shingle.

7. A shingle having transverse edges and a curved longitudinal lower side, a spacing means contained in said side end interlocking means adjacent the corners formed by said transverse edges and said longitudinal lower side, said spacing means being located in the middle of said longitudinal lower side.

8. A shingle having transverse edges and a curved longitudinal lower side, a spacing means contained in said side and interlocking means adjacent the corners formed by said transverse edges and said longitudinal lower side, said means consisting of slits in one of said transverse edges and said longitudinal side, said spacing means being located in the middle of said longitudinal lower side.

9. A shingle of the character described, comprising transverse edges and upper and lower longitudinal sides, a portion of said upper side being straight and said lower side being curved and having a depending portion therein, and interlocking means adjacent the corners formed by said lower side and transverse edges, said depending portion being located between and spaced from said locking means.

Signed by me, this 24th day of June, 1931.

NORMAN P. HARSHBERGER.